(12) United States Patent
Juelke et al.

(10) Patent No.: US 9,309,057 B2
(45) Date of Patent: Apr. 12, 2016

(54) INCLINED CONVEYOR ASSEMBLY WITH INCLINED PENDULUM SHAFT

(71) Applicant: Deere & Company, Moline, IL (US)

(72) Inventors: Johannes Juelke, Esslingen (DE); Martin Rittershofer, Kaiserslautern (DE); Volker Fuchs, Saarebourg (DE)

(73) Assignee: Deere & Company, Moline, IL (US)

( * ) Notice: Subject to any disclaimer, the term of this patent is extended or adjusted under 35 U.S.C. 154(b) by 170 days.

(21) Appl. No.: 14/133,346

(22) Filed: Dec. 18, 2013

(65) Prior Publication Data

US 2014/0166433 A1 Jun. 19, 2014

(30) Foreign Application Priority Data

Dec. 19, 2012 (DE) .................. 10 2012 223 769

(51) Int. Cl.
| | | |
|---|---|---|
| *A01D 67/00* | (2006.01) | |
| *A01D 75/28* | (2006.01) | |
| *B65G 41/00* | (2006.01) | |
| *A01D 41/16* | (2006.01) | |

(52) U.S. Cl.
CPC .............. *B65G 41/002* (2013.01); *A01D 41/16* (2013.01); *A01D 75/287* (2013.01)

(58) Field of Classification Search
CPC ....... A01D 41/16; A01D 41/14; A01D 67/00; Y10S 56/10
USPC .......................................... 56/209, 14.5, 14.6
See application file for complete search history.

(56) References Cited

U.S. PATENT DOCUMENTS

| | | | | |
|---|---|---|---|---|
| 3,324,637 | A | * | 6/1967 | Windsor et al. ................ 56/15.6 |
| 3,431,711 | A | * | 3/1969 | Claas ................................ 56/15.6 |
| 3,731,470 | A | * | 5/1973 | Cornish et al. ................. 56/10.4 |
| 4,253,295 | A | * | 3/1981 | Knepper ......................... 56/15.6 |
| 4,266,391 | A | * | 5/1981 | McDuffie et al. .............. 56/14.5 |
| 4,266,392 | A | * | 5/1981 | Knepper et al. ................ 56/14.5 |
| 4,282,703 | A | * | 8/1981 | Wilson et al. .................. 56/14.6 |
| 4,527,381 | A | * | 7/1985 | Mann .............................. 56/209 |
| 4,612,757 | A | * | 9/1986 | Halls et al. ................... 56/10.2 E |
| 4,733,523 | A | * | 3/1988 | Dedeyne et al. ............... 56/209 |
| 4,776,153 | A | * | 10/1988 | DePauw et al. ............ 56/10.2 E |
| 5,341,628 | A | * | 8/1994 | Schumacher et al. ...... 56/10.2 E |

(Continued)

FOREIGN PATENT DOCUMENTS

| | | |
|---|---|---|
| CH | 689077 A5 | 9/1998 |
| DE | 1016795 B | 10/1957 |

(Continued)

OTHER PUBLICATIONS

European Search Report for related application No. EP13192619 dated Apr. 25, 2014 and machine translation.

*Primary Examiner* — Árpád Fábián-Kovács

(74) *Attorney, Agent, or Firm* — Ingrassia, Fisher & Lorenz PC

(57) ABSTRACT

An inclined conveyor assembly for a combine has a housing, an upper inclined conveyor roller rotatably mounted at the rear of the housing, and a lower inclined conveyor roller positioned at the front end of the housing. An endless conveying element has drivers and rotates about the lower and upper inclined conveyor rollers. A pendulum frame on which a harvester head can be mounted articulates at the front end of the housing and is pivotable about a pendulum shaft. The pendulum shaft is inclined at a rearward and upward angle.

8 Claims, 4 Drawing Sheets

(56) References Cited

U.S. PATENT DOCUMENTS

| | | | |
|---|---|---|---|
| 5,359,836 A * | 11/1994 | Zeuner et al. | 56/10.2 E |
| 5,415,586 A * | 5/1995 | Hanson et al. | 460/8 |
| 5,464,371 A * | 11/1995 | Honey | 460/20 |
| 5,799,483 A * | 9/1998 | Voss et al. | 56/14.9 |
| 5,918,448 A * | 7/1999 | Wheeler | 56/10.4 |
| 6,318,057 B1 * | 11/2001 | Burmann | 56/10.2 R |
| 6,510,680 B2 | 1/2003 | Uhlending et al. | |
| 6,519,923 B1 * | 2/2003 | Cooksey et al. | 56/14.9 |
| 6,735,929 B2 * | 5/2004 | Watts et al. | 56/14.9 |
| 6,826,894 B2 * | 12/2004 | Thiemann et al. | 56/10.2 E |
| 7,222,475 B2 * | 5/2007 | Bomleny et al. | 56/10.2 E |
| 7,430,846 B2 * | 10/2008 | Bomleny et al. | 56/10.2 E |
| 7,870,709 B2 * | 1/2011 | Digman | 56/10.2 E |
| 8,322,122 B2 * | 12/2012 | Dold et al. | 56/15.6 |
| 8,596,447 B2 | 12/2013 | Gentz | |
| 8,631,634 B2 * | 1/2014 | Vereecke et al. | 56/14.9 |

FOREIGN PATENT DOCUMENTS

| | | |
|---|---|---|
| DE | 10018211 A1 | 11/2001 |
| DE | 102007049839 B3 | 6/2009 |
| DE | 102009036104 B4 | 2/2012 |
| EP | 0243540 A1 | 11/1987 |
| EP | 2617280 A1 | 7/2013 |

* cited by examiner

INCLINED CONVEYOR ASSEMBLY WITH INCLINED PENDULUM SHAFT

CROSS-REFERENCE TO RELATED APPLICATION(S)

This application claims priority under 35 U.S.C. §119 to German patent application DE 102012223769.0, filed Dec. 19, 2012, the disclosure of which is incorporated herein by reference.

STATEMENT OF FEDERALLY SPONSORED RESEARCH OR DEVELOPMENT

Not applicable.

FIELD OF THE DISCLOSURE

This disclosure relates to agricultural implements, and in particular to an inclined conveyor assembly with an improved pendulum shaft.

BACKGROUND OF THE DISCLOSURE

Self-propelled combines can have a chassis that is supported on the ground by front, driven wheels (or a track assembly) and rear, steerable wheels. An inclined conveyor assembly, at the front end of which a harvester head can be mounted, is arranged on the front end of the combine. The harvester head can be implemented, for example, as a cutting mechanism with a mower bar and reel arranged thereabove and a downstream cross-conveying auger or a cross-conveyor belt, or as a corn picker with picking units and a cross-conveying auger. During harvesting operation, the harvester head discharges the cut-off or picked-up crop through a rear discharge opening onto the inclined conveyor assembly, which in turn conveys it into the interior of the combine, where it is threshed, separated and cleaned.

The inclined conveyor assembly can have a housing, in which a chain conveyor typically operating in an undershot mode revolves about an upper and a lower inclined conveyor roller, which are rotatably mounted on the housing. The lower inclined conveyor roller is arranged behind the discharge opening of the harvester head, and the upper inclined conveyor roller transfers the crop to a (axial or tangential) threshing drum or an accelerator roller in the combine.

Inclined conveyor assemblies with conveyor belts operating in overshot mode (DE 1 016 975 A) have also been proposed, as well as an inclined conveyor assembly with a rubber-fabric belt comprising transversely arranged steel bars that reach from above into the crop (DE 10 2007 049 839 B3, DE 10 2009 036 104 A1).

In many cases, a so-called pendulum frame is mounted at the front end of the inclined conveyor assembly. This is a frame-like element that can pivot about a (real or virtual) pendulum shaft extending horizontally and in the forward direction and on which the harvester head can be mounted, by upper hooks for example, that contact the pendulum frame from above. The pendulum frame allows a pivoting movement of the harvester head about the horizontal pendulum shaft with respect to the inclined conveyor assembly, for example when traveling on a slope. The pivoting range must be relatively large, particularly if the combine is equipped with height-adjustable front wheels that keep the actual combine and the inclined conveyor assembly horizontal when driving on a slope. In this regard, the reader is referred to prior art according to DE 100 18 211 A1 and DE 295 19 842 U1.

The previously published application DE 10 2012 200 843 A1 shows an inclined conveyor of a combine with a front pendulum frame on which a harvester head is removably mounted. The pendulum frame is mounted rotatably relative to the housing of the inclined conveyor about a pendulum shaft extending in the forward direction and carries a front inclined conveyor roller, about which an endless flexible conveying element rotates, which also rotates about a rear inclined conveyor roller.

The position of the pendulum shaft in the prior art is selected such that it runs at least approximately horizontally if actuators—pivoting the inclined conveyor about an axis of rotation parallel to the upper inclined conveyor roller—have pivoted the front end of the inclined conveyor and the harvester head to a height above the ground that corresponds to that of a customary cutting height.

A disadvantage of the orientation of the pendulum shaft in the prior art is that the distance between a discharge conveyor of the harvester head (the transverse auger in the case of a cutting mechanism) and the lower inclined conveyor roller changes considerably if the latter is rotatably but otherwise immovably mounted on the housing of the inclined conveyor, which complicates the transfer of the crop from the harvester head to the inclined conveyor. Thereby the combine is loaded with a layer of crop which is not uniform across the width of the combine, which can also lead to unsatisfactory working results there.

With reference to FIG. 6, an inclined conveyor assembly 20 according to DE 10 2012 200 843 A1 has a housing 62 in which an upper inclined conveyor roller 64 is arranged. A pendulum frame 78 is pivotably articulated by a pivot pin 80 about a horizontal pendulum shaft 76 at the front end of the inclined conveyor assembly 20. The lower inclined conveyor roller 90 is rotatably mounted on the pendulum frame 78. If the pendulum frame 78 is pivoted about the pendulum shaft 76, this results in relatively large changes of the distances between the outer ends of the lower inclined conveyor roller 90, which is marked with 90' in the extended position, and the upper inclined conveyor roller 74. This change of distance can be absorbed only to a limited extent by the flexible conveying element according to DE 10 2012 200 843 A1, which restricts the achievable pivoting angle.

The problem also cannot be solved by a virtual pendulum shaft running through the center of the pendulum frame 78 or by a pendulum shaft on the underside of the pendulum frame, because due to the width of the inclined conveyor rollers 64, 90, the distance between the outer ends of the two inclined conveyor rollers 64, 90 is still significant.

These geometric problems also result for inclined conveyors with lower inclined conveyor rollers positioned on the housing, because then the discharge conveyor of the harvester head nearly approaches the position of the lower inclined conveyor roller 90, 90' in FIG. 6, so that similar transfer problems result.

SUMMARY OF THE DISCLOSURE

This disclosure provides an inclined conveyor assembly for a combine with an improved pendulum arrangement.

For example, one aspect of the disclosure provides an inclined conveyor assembly for a combine which can have a housing, at the rear end of which an upper inclined conveyor roller is rotatably mounted. A lower inclined conveyor roller is arranged at the front end of the housing. In addition, a pendulum frame on which a harvester head can be removably mounted is pivotably articulated about a pendulum shaft onto the front end of the housing. An endless conveying element with driver means revolves about the lower inclined conveyor roller and the upper inclined conveyor roller. The pendulum shaft is inclined backward and upward (in a working or cutting height and orientation of the harvester head above the ground that is typical for normal harvesting operation).

In an exemplary embodiment of the disclosure, the lower inclined conveyor roller is supported rotatably on the pendulum frame, and an endless, stretchable conveying element with drivers revolves about the lower inclined conveyor roller and the upper inclined conveyor roller. Thereby the lower inclined conveyor roller follows the movement of the pendulum frame (and the harvester head) about the pendulum shaft, and the spatial relationship between the harvester head, its discharge opening, and the lower inclined conveyor roller remains constant even if a harvester head is pivoted about the pendulum shaft. The required mobility between the lower inclined conveyor roller and the upper inclined conveyor roller, about which the endless conveying element with drivers revolves, is made possible because the conveying element is stretchable. In particular, it can be constructed from a rubber-fabric belt on which the drivers are mounted.

The pendulum shaft can also be located on the upper or lower side of the pendulum frame, i.e. above the crop stream or below it. It can alternatively be implemented as a virtual axis with roller bearings between the pendulum frame and the housing.

These and other features and advantages of the present disclosure will become clear to a person skilled in the art after reading the following detailed description and in consideration of the drawings.

BRIEF DESCRIPTION OF THE DRAWINGS

Like reference numerals in the drawings indicate like components, parts, or operations.

DETAILED DESCRIPTION

The following describes one or more example embodiments of the disclosed conveyor assembly with an improved pendulum arrangement, as shown in the accompanying figures of the drawings described briefly above.

Figure 1:
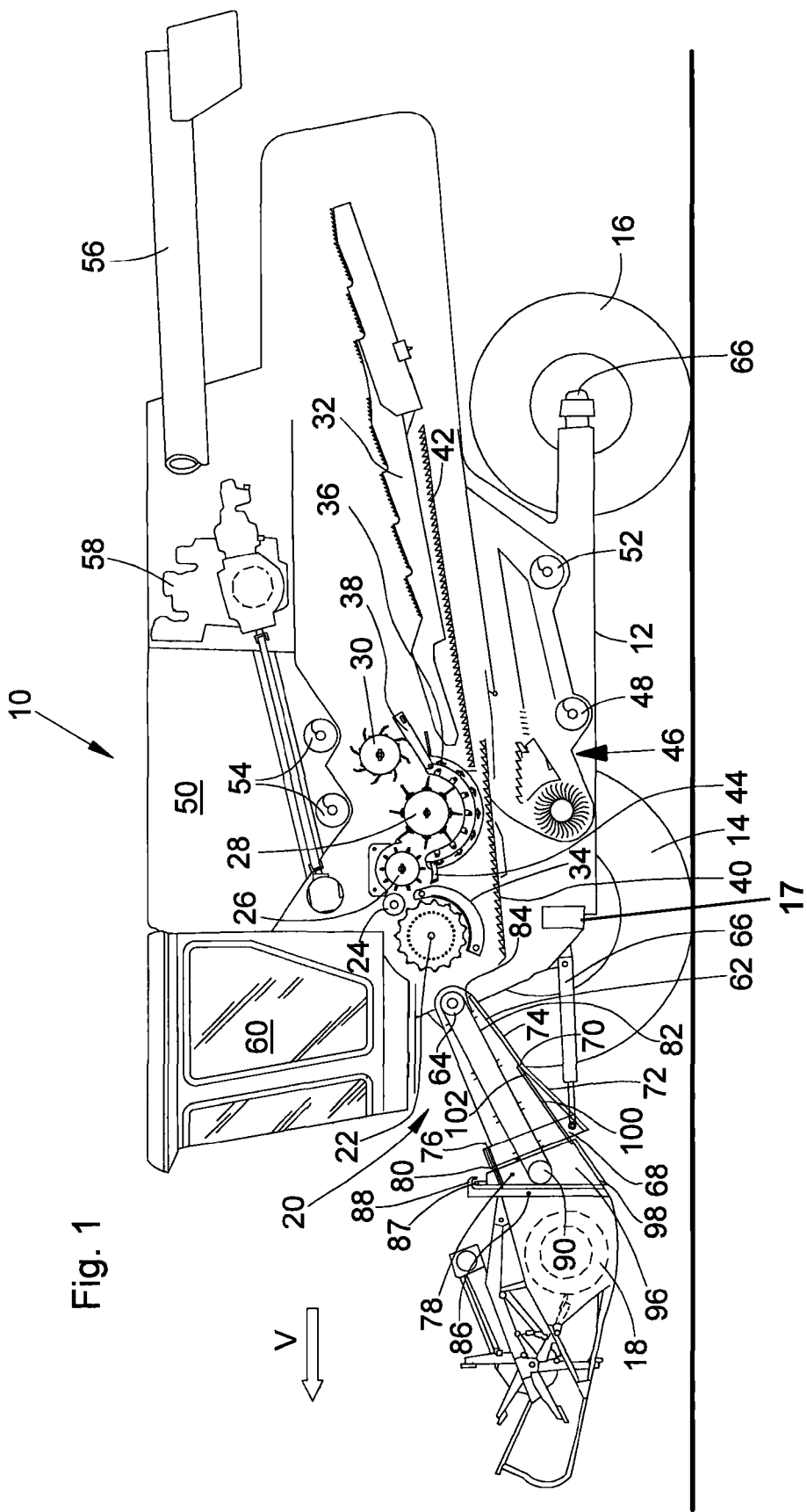
FIG. 1 is a side view of a combine with a harvester head pivotably suspended at the front end of an inclined conveyor assembly according to the disclosure.

FIG. 1 shows a self-propelled harvesting machine in the form of a combine 10, with a frame 12 that is supported on the ground via driven front wheels 14 and steerable rear wheels 16 and is moved forward thereby. The front wheels 14 and rear wheels 16 may be one or more track assemblies, and may generally be referred to as "ground-engaging assemblies" by virtue of their interface with the ground. The wheels 14 are set in rotation by means of driving means, not shown, in order to move the combine 10 over a field to be harvested, for example. Directional indications such as front and back refer below to the driving direction V of the combine 10 in harvesting operation, which runs to the left in FIG. 1. The front wheels 14 could also be replaced by track assemblies. The front wheels 14 (or the track assemblies) may include an adjustment mechanism 17 that is height adjustable with respect to the chassis 12 for horizontal alignment of the chassis 12 when driving on a slope. The rear wheels 16 are mounted on a pivotably mounted axle in order to follow the shape of the ground.

A harvester head 18 in the form of a cutter mechanism is removably connected at the front end area of the harvesting machine 10, in order to be able to harvest crop in the form of grain or other threshable cereals from the field in harvesting mode and feed it upward and backward by an inclined conveyor assembly 20 to a multi-drum threshing mechanism which can have—arranged in succession in the travel direction V—a threshing drum 22, a stripping drum 24, an overshot operating conveyor drum 26, a tangential separator 28 and an impeller drum 30. A straw shaker 32 is downstream of the impeller drum 30. In its lower and rear area, the threshing drum 22 is surrounded by a threshing basket 34. Underneath the conveying drum 26 is a cover 44 furnished with openings or closed, while above the conveying drum 26 there is a fixed cover, and a separator basket 36 with adjustable finger elements is located underneath the tangential separator 28. A grain finger 38 is arranged underneath the impeller drum 30. In place of the illustrated multi-drum threshing mechanism, any other kind of threshing and separating mechanism could be used, e.g. a single tangential threshing drum with downstream straw shakers or separating rotors or an axial threshing and separating unit with one or two axial threshing and separating rotors.

The mixture containing grain and impurities passing through the threshing basket 34, the separating basket and the straw shaker 32 reaches a cleaning device 46 via conveyor floors 40, 42. Grain cleaned by the cleaning device 46 is fed by means of a grain auger 48 to an elevator, not shown, which conveys it into a grain tank 50. A return auger 52 feeds incompletely threshed grain heads through another elevator, not shown, back to the threshing process. The chaff can be ejected at the rear side of the screen unit by a rotating chaff distributor or discharged by a straw chopper (not drawn) arranged downstream of the straw shaker 32. The cleaned grain from the grain tank 50 can be unloaded by an unloading system with cross augers 54 and an unloading conveyor 56. The above-mentioned systems are driven by means of an internal combustion engine 58 and are monitored and controlled by an operator from a driver's cab 60.

The inclined conveyor assembly 20 can have a housing 62 that is articulated to the chassis 12 about an axle of an upper inclined conveyor roller 64 extending horizontally and transversely to the forward direction. The inclined conveyor assembly 20 is pivoted about the axle of the upper inclined conveyor roller 64 by means of two actuators 66 in the form of hydraulic cylinders which are articulated on both sides of the inclined conveyor assembly 20 at one end to the lower front end of the chassis 12 and at the other end, to a rectangular (as viewed from the front) frame element 68 behind the front lower end of the housing 62 for the inclined conveyor assembly 20. A controller (not shown) controls the actuators 66 during the harvesting operation in such a manner that the harvester head 18 is moved over the field to be harvested at a desired height or with a desired pressure on the ground. In a known manner, the housing 62 of the inclined conveyor assembly 20 can have upper and lower walls that are connected to one another by lateral walls. The lower wall of the housing 62 is bent downward at an angle at a point 70 at approximately half the length of the housing 62, so that the wall can have an upper part 74 and a lower part 72, which is angled forward and downward relative to the upper part 74 and which is connected at its lower end to the rectangular frame element 68, underneath an imaginary extension of the upper part 74 of the lower wall of the housing 62.

The rectangular frame element 68 is connected to the housing 62 rigidly or pivotably about an axis (not shown) running transversely to the forward direction horizontally, in order to adapt the orientation of the harvester head 18 to the respective harvesting conditions and/or the dimensions of the wheels 14, 16 of the combine 10 and to the inclined conveyor assembly 20. The rectangular frame element 68 supports a pendulum frame 78 attached via a central pivot pin 80 to the upper horizontal part of the frame element 68. The pendulum frame 78 is pivotable about a pendulum shaft 76 defined by the pivot pin 80 and extending, when viewed from above, parallel to the forward direction V and, in a view from the side as shown in FIG. 1, at an angle rearward and upward with respect to the frame 68 and the housing 62.

Figure 7:
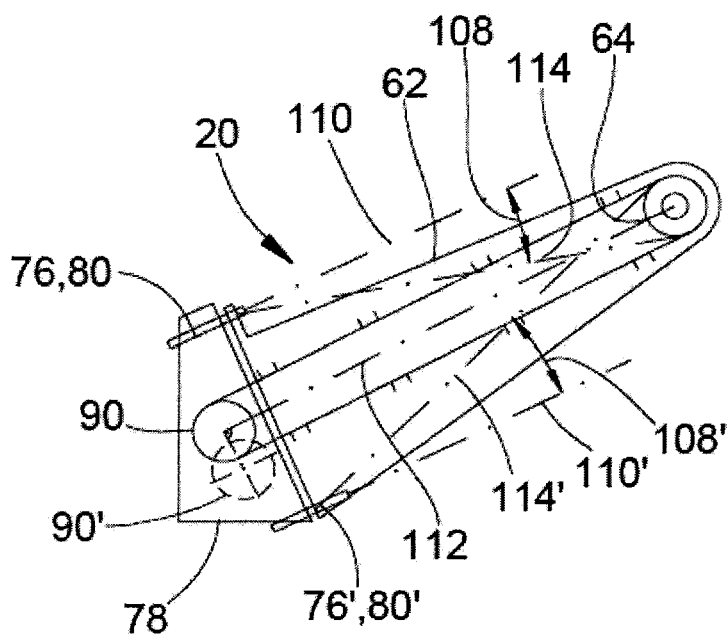
FIG. 7 shows a schematic side view of an inclined conveyor assembly according to the disclosure.

The pendulum shaft 76 in the illustrated embodiment is oriented in parallel to an imaginary connection line 112 between the center of the pendulum frame 78 (i.e. the axis of rotation of the lower inclined conveyor roller 90) and the axis of rotation of the upper inclined conveyor roller 64. This inclination of the pendulum shaft 76 rearward and upward is provided particularly if a frame element 68, adjustable about an axis running transversely to the forward direction and horizontally, is in a position suitable for normal harvesting operation. In other embodiments of the disclosure or for a frame element 68 displaced about the aforementioned axis, the pendulum shaft 76 can also be oriented further downward or upward and can lie in particular in a region 108, which is bounded on one side by a line 110 intersecting the pendulum shaft 76 and parallel to the connection line 112 between the axis of rotation of the lower inclined conveyor roller 90 and the axis of rotation of the upper inclined conveyor roller 64, and on the other side by an imaginary connecting line 114 between the pendulum shaft 76 and the (underside of) the upper inclined conveyor roller 64. This area can also be extended upward symmetrically relative to the line 110 intersecting the pendulum shaft 76 and parallel to the connecting line 112. If the pendulum shaft 76 is underneath the pendulum frame 78, as indicated in FIG. 7 with the reference number provided with an apostrophe, this area 108' is mirror symmetric about the connecting line 112 with respect to the above-mentioned region 108. This area 108' could also be extended symmetrically downward with respect to the parallel line 110'.

A fastening frame 86 for the harvester 18 is supported on the pendulum frame 78 by hooks 88 that extend over protrusions 87 of the pendulum frame 78. The harvester head 18 can accordingly be taken off the pendulum frame 78 by positioning the harvester head 18 above a suitable base (e.g. a cutter transport wagon) and then lowering the inclined conveyor assembly 20 by means of the actuators 66, the hooks 88 then detaching from the pendulum frame 78. Attachment is performed in the opposite order and direction. It would also be possible to provide additional locking bars between the harvester head 18 and the pendulum frame 78 that could be actuated manually or by outside power. The pivoting of the harvester head 18 and the pendulum frame 78 about the pendulum shaft 76 can be accomplished merely by the force of gravity, or externally operated actuators (not shown) may be provided, which automatically vary the pivot angle about the pendulum shaft 76 in a conventional manner based on signals from sensors distributed over the width of the harvester head 18 for detecting the height above the ground and or the contact pressure.

Figure 2:
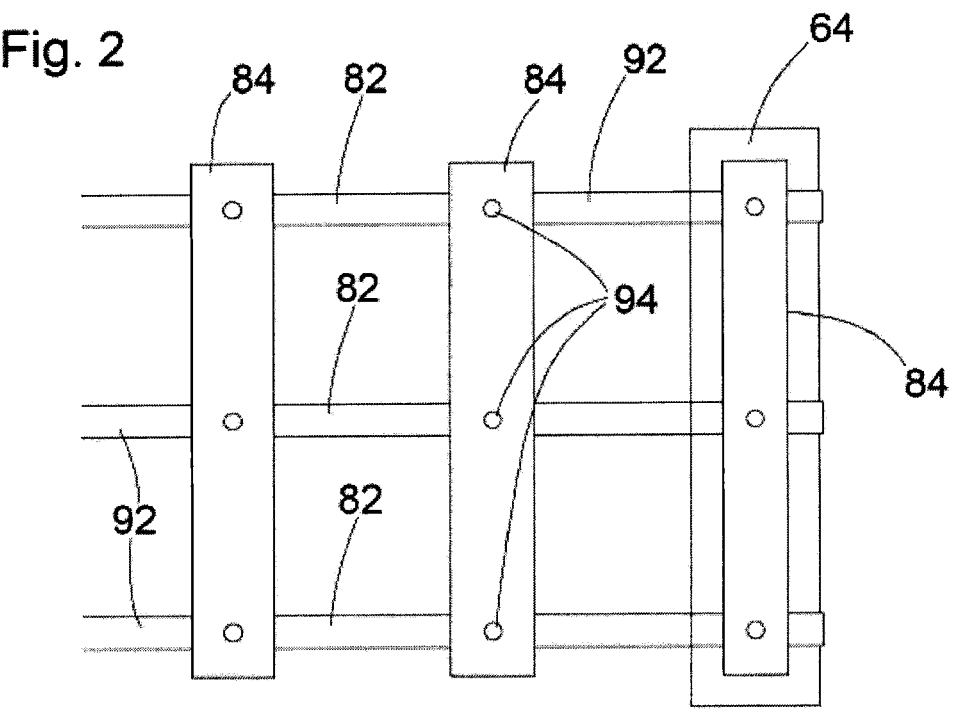
FIG. 2 shows a plan view of an endless conveying element and its drivers.

A lower inclined conveyor roller 90 is rotatably mounted on the pendulum frame 78. The axis of rotation of the roller extends transversely to the forward direction V and horizontally when the pendulum frame 78 is oriented horizontally. An endless conveying element 82 with drivers 84 that convey the grain in undershot mode during operation revolves around the inclined conveyor rollers 64, 90. The conveying element 82 is stretchable and may have several rubber fabric belts 92 distributed across the width of the housing 62, which are connected to one another by the drivers 84, as shown in FIG. 2. The arrangement from FIG. 2 can be doubled, i.e. two respective drivers 84 along with the associated rubber fabric belts 92 can be arranged one alongside the other in the housing 62. The conveying element 82 is driven on its inner side via cams, which engage in corresponding recesses in the inclined conveyor rollers 64 and 90, of which at least one can be driven by the internal combustion engine 58. The drivers 84 are constructed as U-shaped steel bars which can extend across the width of the housing 62, but can also be made from different material and have a different cross section. To produce an optimal connection between the drivers 84 and the conveying element 82, threaded bolts 94 are vulcanized into the rubber/fiber belts 92. The conveying element 82 is tensioned in operation in such a manner that the drivers 84 do not scrape the bottom of the housing 62 when the pendulum frame 78 is horizontal, which minimizes the wear and noise generation.

In the side view as shown in FIG. 1, the pendulum frame 78 is approximately trapezoidal or triangular because the rectangular frame element 68 at the front end of the housing 62 for the inclined conveyor assembly 20 extends at an angle forward and upward due to the pendulum shaft 76 being pointed forward and upward, whereas the mounting frame 86 for the harvester head 18 extends nearly vertically in the ordinary operating position of the harvester head 18 shown in FIG. 1 (corresponding to a normal cutting height), and the pendulum frame 78 fills out the space between them. Like the housing 62 of the inclined conveyor assembly 20, the pendulum frame 78 has lateral walls 96 and a bottom 98. The pendulum frame 78 may be stiffened by frame elements (not shown). In order to reduce the torque on the pivot pin 80, additional connecting elements (not shown) that allow a relative movement, e.g. rollers, can be arranged between the bottom 98 or the lower rear end of the pendulum frame 78 and the rectangular frame element 68 at the front end of the housing 62 for the inclined conveyor assembly 20.

A flexible bottom element 100 runs between the bottom 98 of the pendulum frame 78 and the point 70 between the two parts 72, 74 of the lower wall of the housing 62. The flexible bottom element 100 extends over the entire width of the housing 62. The flexible bottom element 100 is produced in the embodiment shown in FIG. 1 from an inherently flexible material such as spring steel or rubber. The flexible bottom element 100 is fixed at least to the bottom 98 and to the point 70 of the housing 62 (over its width in both cases).

The flexible bottom element 100 can also be coupled movably to the lateral walls of the housing 62, for example by angle bracket elements, not shown, a horizontal leg coupled to the flexible bottom element 100 and a vertical leg with one or more elongated holes, through which a pin connected to the side wall 62 passes. The pin could also be located on the vertical leg and pass through an elongated hole in the side wall of the housing 62. Thereby a seal can be achieved between the flexible base element 100 and the side wall of the housing 62 in order to prevent significant quantities of crop from reaching the intermediate space between the flexible bottom element 100 and the front part 72 of the lower wall of the housing 62. To prevent crop from accumulating between the flexible bottom element 100 and the front part 72 of the lower wall of the housing 62 and ultimately hampering the movement of the flexible bottom element 100, the front part 72 of the lower wall of the housing 62 can be furnished with openings or constructed in a grid design.

Figure 3:
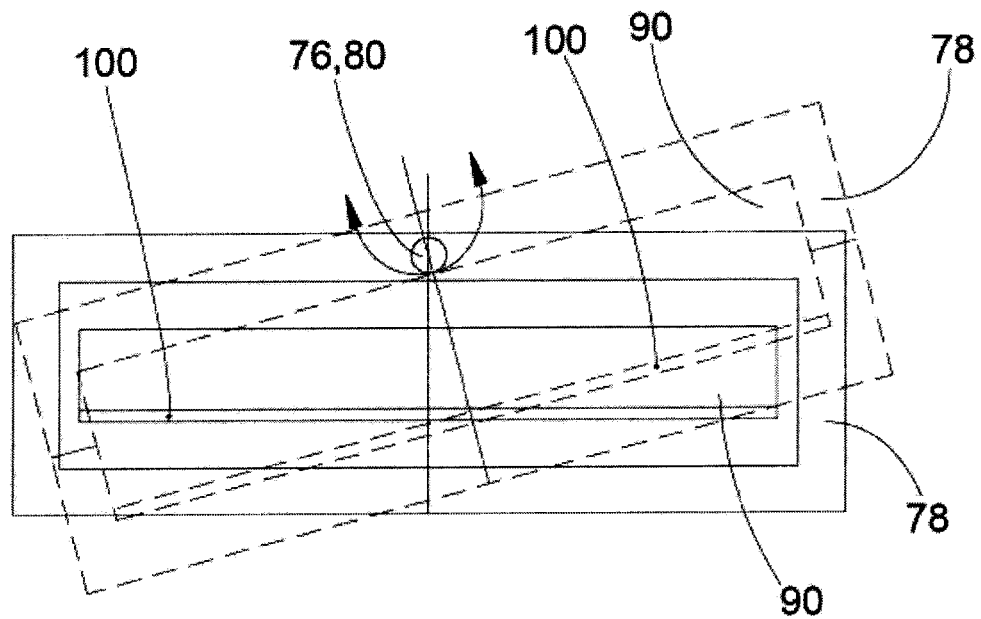
FIG. 3 is a schematic front view of a pendulum frame with a lower inclined conveyor roller mounted thereon and the front area of the inclined conveyor assembly.

As can be recognized based on FIG. 3, the pendulum frame 78 and the lower inclined conveyor roller 90 undergo the same pivoting motion about the pendulum shaft 76. Thereby the transfer of crop from the harvester head 18 to the inclined conveyor assembly 20 is optimized even if the pendulum frame 78 is pivoted about the pendulum shaft 76. The stretchability of the conveying element 82 allows pivoting of the lower inclined conveyor roller 90 relative to the upper inclined conveyor roller 64 about the pendulum shaft 76. The front end of the flexible bottom element 100 also undergoes this movement about the pendulum shaft 76, as is likewise shown in FIG. 3. On the other hand, the rear end of the flexible bottom element 100 is coupled to the housing 62 of the inclined conveyor assembly 20 at the point 70, and does not undergo a pivoting movement about the pendulum shaft 76. During the pivoting movement of the pendulum frame 78 and the harvester head 18 about the pendulum shaft 76, the flexible bottom element 100 is accordingly twisted. It can undergo this torsion due to its flexibility. By means of the bottom element 100, a floor of the inclined conveyor assembly between the pendulum frame 78 and the point 70 is obtained which forms a ramp that fits the pivot angle of the pendulum frame and enables a continuous and relatively flat transfer of the crop from the pendulum frame 78 to the rear part 74 of the housing 62 for the inclined conveyor assembly 20.

Because of the inclination of the pendulum shaft 76 upward and to the rear, the change of distance between the upper inclined conveyor roller 64 and the lower inclined conveyor roller 90 when the pendulum frame 78 pivots about the pendulum shaft 76 is kept to a sufficiently small magnitude that it can be absorbed by the elasticity of the conveying element 82. In addition, the transfer of crop from the harvester head 18 or pendulum frame 78 to the inclined conveyor assembly 20 is improved.

Figure 4:
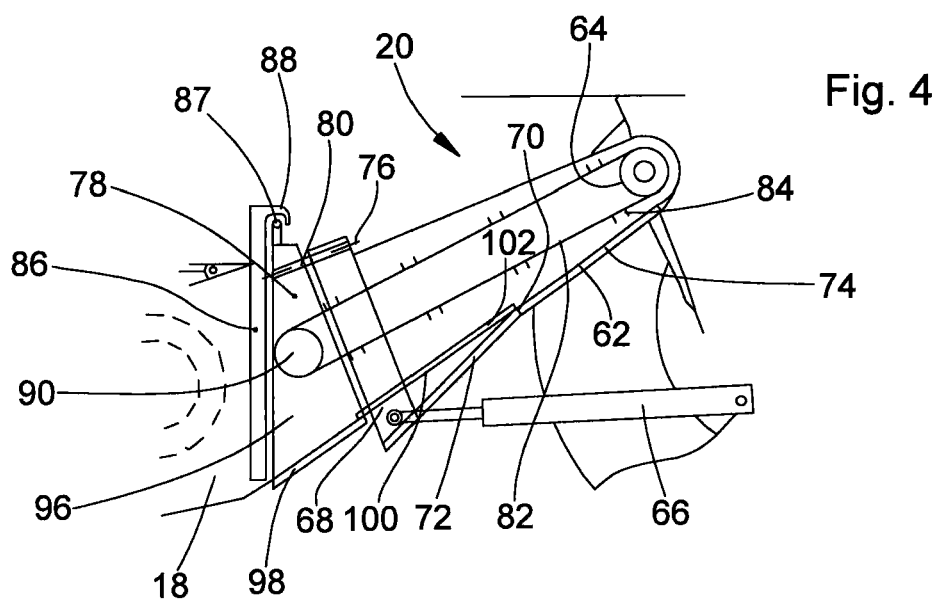
FIG. 4 shows an enlarged view of the inclined conveyor assembly of FIG. 1 with a second embodiment of a flexible ground element.

In an embodiment illustrated in FIG. 4, sliding elements 102 consisting of a material (e.g. plastic) that has a smaller coefficient of friction than that of the flexible material (in particular rubber) of the flexible bottom element 100 are arranged above the flexible bottom element 100. The sliding elements 102 can be in the form of bars and can be oriented one alongside another in the conveyance direction of the crop or transversely one after another. They are separately connected to the flexible bottom element 100, e.g. by screws or rivets.

Figure 5:
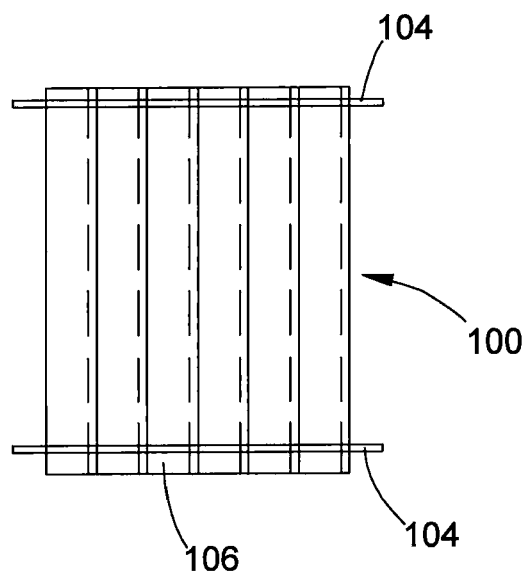
FIG. 5 shows a plan view of a third embodiment of a flexible ground element.

In the embodiment shown in FIG. 5, the flexible bottom element 100 consists of several successive elements 106 overlapping one another in the longitudinal direction (e.g. the flow direction of the crop). These elements 106 are mounted on supporting rods 104 running in the forward direction V. In this embodiment, the elements 106 can consist of an inherently flexible material such as spring steel or rubber, while the supporting rods can be inherently rigid or flexible. In the latter case, the elements 106 can be inherently rigid. The elements 106 overlap one another in the direction of crop flow, resulting in steps dropping to the rear in the direction of crop flow that do not further disturb the flow of the crop. Unlike that which is shown in FIG. 5, the elements 106 can also extend in the direction of crop flow, i.e. rotated by 90°.

It remains to be noted that the conveying element 82 can be produced continuously or can have two ends that can be connected by suitable means. The inclined conveyor rollers 64, 90 can be provided with a constant cross section over their length, as shown in FIG. 2, or may have a shaft with discs thereon, on which the conveying element 82 is supported. The pendulum shaft 78 need not be physical, but can also be virtual in that the pendulum frame 72 is supported by roper bearings on the frame 68, which makes it possible to position the pendulum shaft 78 in the center of the pendulum frame 72.

Figure 6:
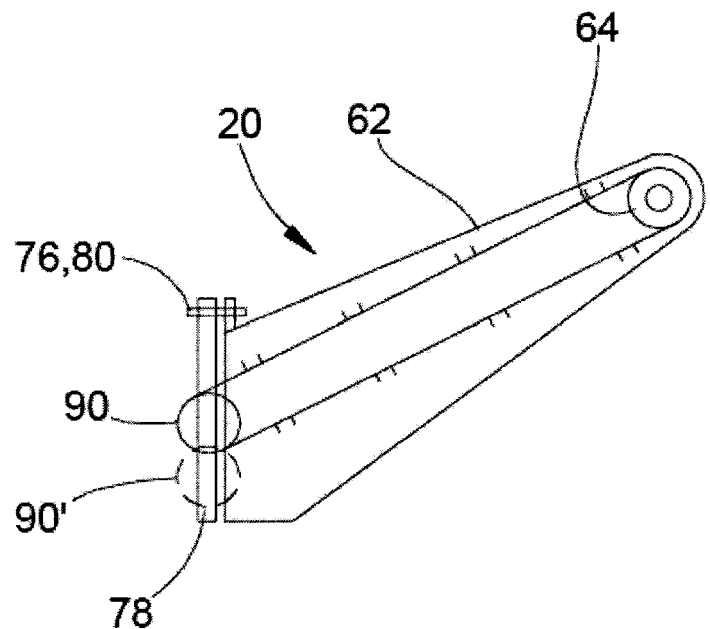
FIG. 6 shows a schematic side view of an inclined conveyor assembly according to the prior art, as discussed above.

Due to the proposed geometry of the pendulum shaft, the distance between the outer ends of the pendulum frame and the housing of the inclined conveyor (including its upper inclined conveyor roller) when the pendulum frame is pivoted about the pendulum shaft varies considerably less than in prior art, which facilitates a homogeneous discharge of crop across the width of the inclined conveyor. For illustrative purposes, the reader is referred to FIG. 7, in which an inclined conveyor assembly according to the disclosure is shown, the reference numerals of which correspond to those in FIG. 6, and which, also because of the mounting of the lower inclined conveyor roller on the pivot head, enables a more homogeneous transfer of crop from the harvester head into the inclined conveyor across the width thereof, because the change of distance between the inclined conveyor rollers 90' and 64 is smaller than that in FIG. 6. These advantages, including an improved crop transfer from the harvester head or pendulum frame into the housing of the inclined conveyor assembly also result for inclined conveyors in which the lower inclined conveyor roller, unlike that which is illustrated in FIG. 7, is mounted on the housing (and not on the pendulum frame).

The pendulum shaft may be implemented in such a manner that the pendulum shaft is oriented parallel to an imaginary connection line between the center of the pendulum frame (or the center of the lower inclined conveyor roller) and the upper inclined conveyor roller.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An inclined conveyor assembly for a combine, comprising:

a housing;

an upper inclined conveyor roller rotatably mounted at a rear end of the housing;

a lower inclined conveyor roller positioned at a front end of the housing;

an endless conveying element having at least one driver and rotating about the lower inclined conveyor roller and the upper inclined conveyor roller; and a pendulum frame articulated at the front end of the housing pivotable about a pendulum shaft and on which a harvester head can be mounted, wherein the pendulum shaft is inclined to extend upward in a rearward direction with respect to a driving direction;

wherein the pendulum shaft is oriented substantially parallel to an imaginary connection line extending between the lower inclined conveyor roller and the upper inclined conveyor roller.

2. The inclined conveyor assembly of claim 1, wherein the lower inclined conveyor roller is rotatably supported by the pendulum frame.

3. The inclined conveyor assembly of claim 1, wherein the endless conveying element is stretchable.

4. The inclined conveyor assembly of claim 3, wherein the endless conveying element includes at least one fabric-rubber belt.

5. The inclined conveyor assembly of claim 1, wherein the pendulum shaft is located on an upper side of the pendulum frame.

6. The inclined conveyor assembly of claim 1, wherein the pendulum shaft is located on a lower side of the pendulum frame.

7. A combine, comprising:

a chassis rotatably mounting front and rear ground-engaging assemblies; and an inclined conveyor assembly including:

a housing;

an upper inclined conveyor roller rotatably mounted at a rear end of the housing;

a lower inclined conveyor roller positioned at a front end of the housing;

an endless conveying element having at least one driver and rotating about the lower inclined conveyor roller and the upper inclined conveyor roller; and a pendulum frame articulated at the front end of the housing pivotable about a pendulum shaft and on which a harvester head can be mounted, wherein the pendulum shaft is inclined to extend upward in a rearward direction with respect to a driving direction and is oriented substantially parallel to an imaginary connection line extending between the lower inclined conveyor roller and the upper inclined conveyor roller.

8. The combine of claim 7, wherein the front ground-engaging assembly includes an adjustment mechanism that is height-adjustable relative to the chassis.

* * * * *